United States Patent
Miles

(10) Patent No.: US 6,718,537 B1
(45) Date of Patent: Apr. 6, 2004

(54) METHOD AND SYSTEM TO STRESS INTERACTIONS IN A TEST MACHINE

(75) Inventor: James Darrell Miles, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 518 days.

(21) Appl. No.: 09/637,316

(22) Filed: Aug. 10, 2000

(51) Int. Cl.[7] ............................................. G06F 9/45
(52) U.S. Cl. ..................................................... 717/127
(58) Field of Search .............................. 717/124–135; 345/733–759

(56) References Cited

U.S. PATENT DOCUMENTS

| | | | | |
|---|---|---|---|---|
| 5,630,157 A | * | 5/1997 | Dwyer, III | 712/23 |
| 5,805,795 A | * | 9/1998 | Whitten | 714/38 |
| 6,002,869 A | * | 12/1999 | Hinckley | 717/124 |
| 6,002,871 A | * | 12/1999 | Duggan et al. | 717/135 |
| 6,029,262 A | * | 2/2000 | Medd et al. | 714/724 |
| 6,167,479 A | * | 12/2000 | Hartnett et al. | 710/260 |
| 6,249,880 B1 | * | 6/2001 | Shelly et al. | 714/34 |
| 6,332,212 B1 | * | 12/2001 | Organ et al. | 717/128 |
| 6,378,124 B1 | * | 4/2002 | Bates et al. | 717/129 |
| 6,415,402 B2 | * | 7/2002 | Bishop et al. | 714/724 |
| 6,473,894 B1 | * | 10/2002 | Shrader et al. | 717/126 |
| 6,516,460 B1 | * | 2/2003 | Merks et al. | 717/124 |
| 6,519,766 B1 | * | 2/2003 | Barritz et al. | 717/130 |
| 6,530,076 B1 | * | 3/2003 | Ryan et al. | 717/128 |

* cited by examiner

*Primary Examiner*—John Chavis
(74) *Attorney, Agent, or Firm*—Joseph L. Lally; J. Bruce Schelkopf; Casimer K. Salys

(57) ABSTRACT

A method of executing test cases with a parallel test segment of a test sequence, is disclosed. Initially, a test sequence is defined that includes a parallel test segment including at least a first test case and a second test case. A cycle time of the parallel test segment is determined where the determined cycle time is greater than the execution time of either the first or second test cases. The test sequence is then executed repeatedly. During each execution of the test sequence, the start point of the first and second test cases within the parallel test segment are varied with respect to one another preferably in a random fashion. The parallel test segment cycle time may be calculated by measuring the execution time of the first and second test cases, determining a desired slack time percentage for the first test case if the first test case is longer than the second test case, calculating a test segment cycle time based on the measured cycle times and the desired slack time percentage, and calculating a slack time for second test case based on the parallel test segment cycle time and the execution time of the second test case. In one embodiment, the test sequence is executed repeatedly until stopped by user input. In another embodiment, the user specifies a number of test sequence iterations that are to be executed or a total test time from which the number of iterations are derived.

21 Claims, 5 Drawing Sheets

METHOD AND SYSTEM TO STRESS INTERACTIONS IN A TEST MACHINE

RELATED APPLICATION

The subject matter of this application is related to the subject matter disclosed in the patent application entitled Interactive Test Sequence Generation, Serial No. 09/594,629 filed Jun. 15, 2000 [hereinafter, referred to as the "'629 application"], which shares a common assignee and inventive entity with the present application and is incorporated by reference herein.

BACKGROUND

1. Field of the Present Invention

The present invention generally relates to the field of computer software and more particularly to a system and method for testing interactions between test cases executing on a data processing system or network.

2. History of Related Art

In the field of computers and, more particularly, computer networks, it is often desirable to characterize or debug the network by executing a specific sequence of events on the network to determine if the particular sequence produces any unanticipated actions or results. In a TCP/IP connected network, for example, multiple nodes of a network are interconnected and capable of communicating with one another. In such a network, a communication link or pipeline between any two nodes can be established by opening a "socket," which consists of an Internet protocol (IP) address and a port number for each node. When the socket is open, the nodes at either end of the pipeline transmit packets to communicate information (data) back and forth. When the data transmission is completed, the socket is closed. The TCP/IP protocol is just one example of a mechanism by which nodes on a network can communicate with one another.

Because a network typically may include a large number of computers or other data processing devices or systems running on a variety of platforms, the number of events or sequences of events that the network may experience is virtually limitless and essentially impossible to predict or otherwise anticipate. Thus, the task of debugging or characterizing a network for reliable interaction between the nodes in a timely manner is exceedingly difficult. Typically, the task of characterizing a network consists of a user writing a series of test sequences, each of which includes one or more test cases that are assembled in a manner determined by the user. The user must write a new test sequence for each specific sequence of events that the user wants to execute. In this manner, the typical method of generating test sequences is manually intensive thereby making it essentially impossible to produce enough test sequences to achieve any significant degree of coverage for a network of any appreciable complexity. The '629 application disclosed a system and method enabling a user to automatically generate large numbers of test sequences to exercise a computer network or other similar system including facilities to exercise two or more test cases in parallel.

While providing a mechanism for enabling parallel execution of multiple test cases is highly desirable, it would be still further desirable to enable a mechanism to stress interactions between test cases that execute in parallel by randomly varying the starting times of test cases within a parallel test segment.

SUMMARY OF THE INVENTION

The goal identified above is achieved by a method and system disclosed herein for executing test cases within a parallel test segment of a test sequence to stress interactions between the test cases. Initially, a test sequence is defined that includes a parallel test segment including at least a first test case and a second test case. The cycle time of the parallel test segment is determined. During each iteration, the initiation or start time of the first and second test cases is varied with respect to one another. In one embodiment, the determined cycle time is greater than the execution time of either the first or second test cases. The cycle time may be calculated by measuring the execution time of the first test and second test cases, determining a desired slack time for the first test case if the first test case is longer than the second test case, calculating a test segment cycle time based on the measured cycle times and the desired slack time, and calculating a slack time for the second test case based on the test segment cycle time and the measured execution time of the second test case. In one embodiment, the start times of the first and second test cases are generated randomly within their respective slack times. In one embodiment, the test sequence is executed repeatedly until terminated by a user. In another embodiment, the test sequence executes a specified number of iterations. The number of iterations that the test sequence executes may be specified directly by the user. Alternatively, the user may specify a total test time from which the number of test sequence iterations is derived by dividing the total test time by the test sequence cycle time.

BRIEF DESCRIPTION OF THE DRAWINGS

Other objects and advantages of the invention will become apparent upon reading the following detailed description and upon reference to the accompanying drawings in which.

Figure 1:
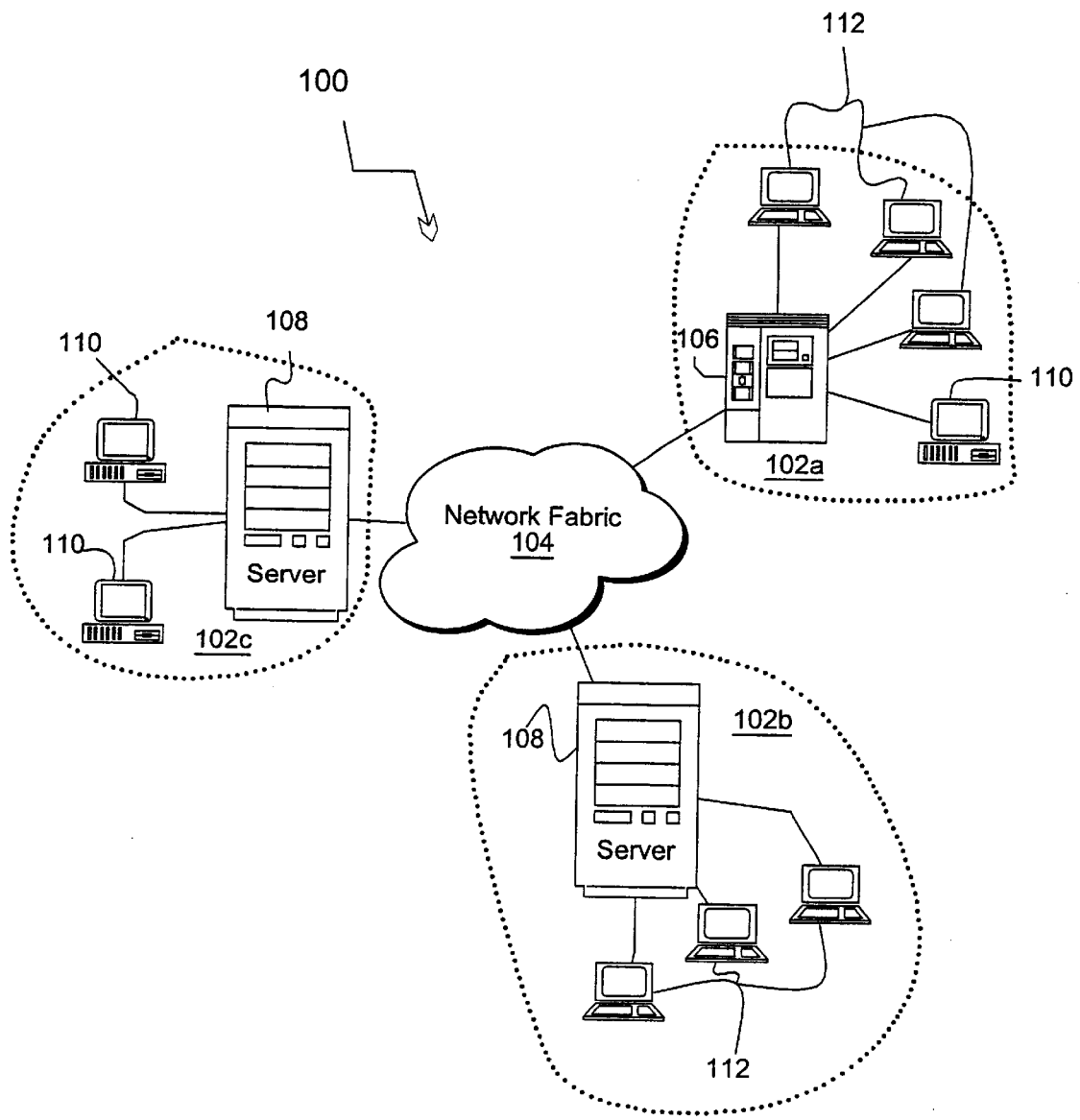
FIG. 1 is a simplified representation of a network of data processing devices.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates a computer network 100 suitable for use in conjunction with one embodiment of the present invention. Network 100 typically includes various nodes 102a, 102b, 102c, etc. (generically or collectively referred to as node(s) 102) that are interconnected via an interconnection fabric 104. A node 102 may include a mainframe computer 106, a server 108, a desktop computer 110, terminals or thin clients 112, as well as a variety of other devices including mass storage devices, printers, routers, hubs, as will be familiar to those knowledgeable in the design of computer networks.

Communication between nodes 102 is enabled via various communication protocols including, as an example, the TCP/IP communication protocol familiar to users of the world wide web. Because the number of nodes can be extremely large and the types of nodes that comprise network 100 can vary significantly, network 100 can experience an essentially infinite number of event sequences. Creating a sufficient number of test sequences for purposes of determining if the reliability of network 100 is susceptible to any particular event sequences may difficult or infeasible. This is particularly true if each test sequence must be written individually.

Generally speaking, the invention contemplates a method of stressing interactions between test cases in a parallel test segment of a test sequence. A user of a test sequence controller application generates one or more test sequences by selecting test cases from a list of test cases. The user may create both serial and parallel segments thereby permitting the creation of complex test sequences. A particular test case can be selected more than once per test sequence. Each instance of a test sequence can be customized using a test case editor of the test sequence controller. Interactions between test cases in a parallel test sequence are stressed by repeatedly executing the parallel test segment while varying the relative starting times of the test cases within the segment. In this manner, any interactions between specific events in each of these test cases are more likely to be tested.

In one embodiment, the invention is implemented as computer software that executes on a data processing system such as a microprocessor based computer. In this embodiment, the invention may comprise a computer program product that includes computer code means (instructions) that are executable by a microprocessor. The instructions may be contained in (encoded on) a suitable storage device such as a floppy diskette, a hard drive, a CD ROM, a DVD diskette, a tape storage, a non-volatile memory device such as a ROM or flash card, or a volatile memory storage element such as the system memory (i.e., DRAM) or cache memory (i.e., SRAM) of a data processing system.

Figure 2A:
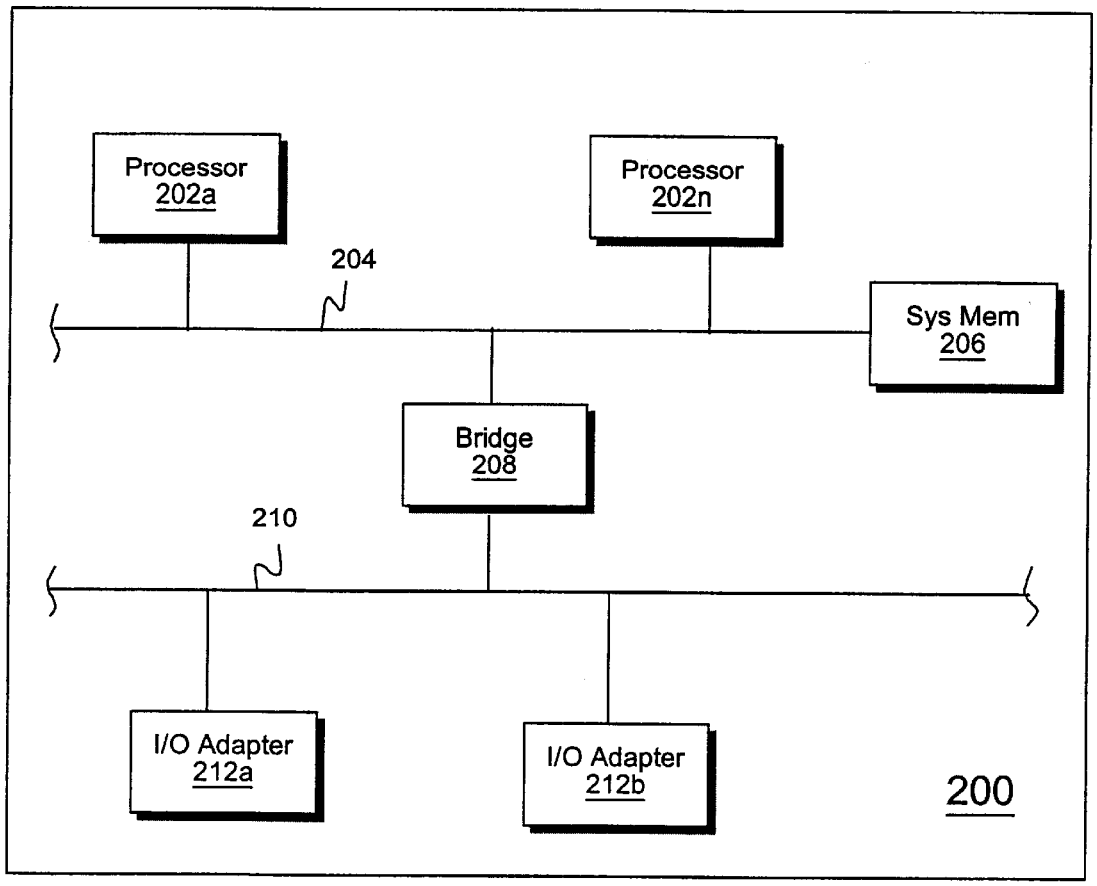
FIG. 2A illustrates a data processing system suitable for implementing a method of generating test sequences according to one embodiment of the invention.

Turning to FIG. 2A, a simplified block diagram of a data processing system 200 suitable for executing the computer software of the present invention is presented. In the depicted embodiment, data processing system 200 includes one or more processors 202a through 202n (generically or collectively referred to herein as processor(s) 202) connected to a system bus 204. A system memory 206 is accessible to processors 202 via system bus 204. Each processor 202 may be implemented as a reduced instruction set (RISC) microprocessor such as the PowerPC® microprocessor from IBM Corporation. In another embodiment, processors 202 may comprise x86 compatible microprocessors such as Pentium® processors from Intel Corporation and Athlon® processors from Advanced Micro Devices. Typically, operating system software is installed on each data processing system 200 of network 100. Suitable operating system software may include a Unix based operating system such as the AIX® operating system from IBM, a non-Unix based operating system such as the Windows® family of operating systems from Microsoft, or a network operating system such as JavaOS® from Sun Microsystems.

In the depicted embodiment, data processing system 200 includes a bus bridge 208 that couples system bus 204 to an I/O bus 210. Although only a single bus bridge 208 and a single I/O bus 210 are depicted, other embodiments of data processing system 200 may include multiple bridges 208 and multiple I/O busses 210. I/O bus may be implemented according to any of a variety of industry standardized I/O bus architectures including the industry standard architecture (ISA), the extended industry standard architecture (EISA), the peripheral components interface (PCI), and the advanced graphics peripheral (AGP) architecture, all as will be familiar to those in the field of microprocessor based computing systems.

Figure 2B:
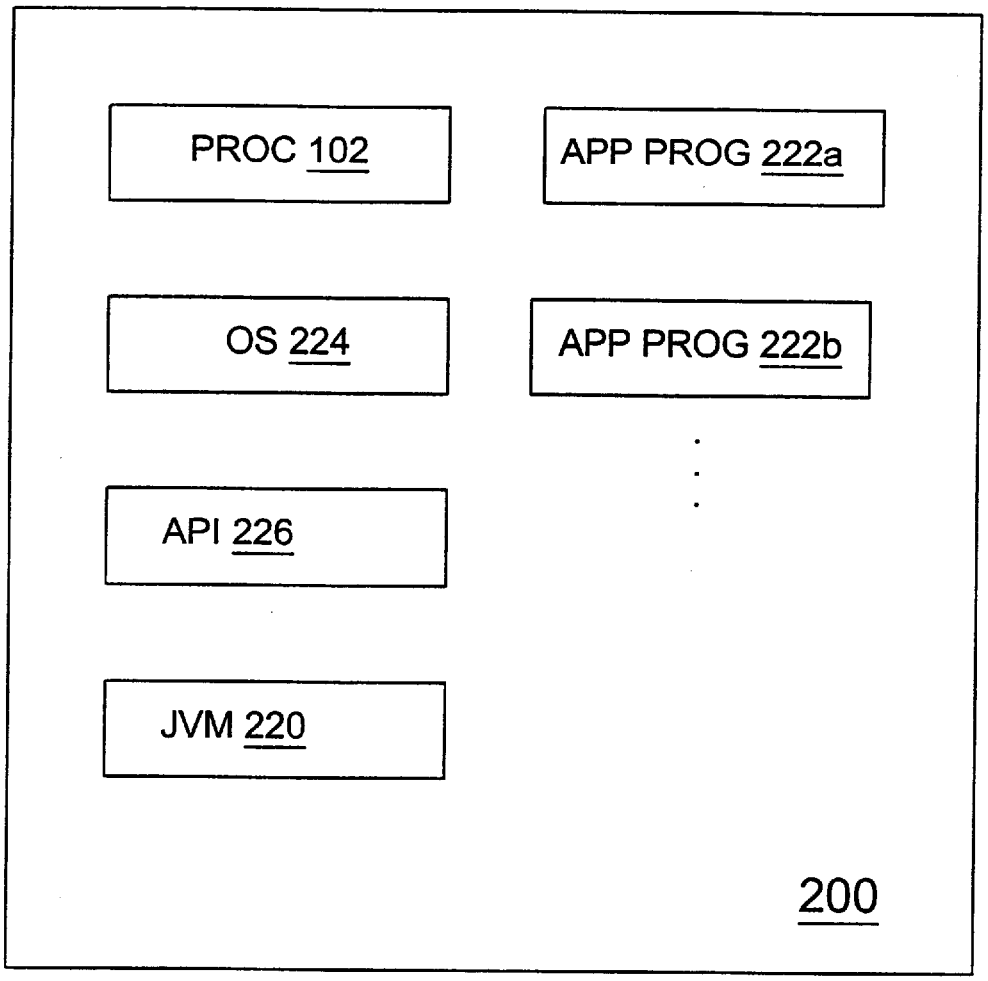
FIG. 2B is a block diagram of a software architecture of the data processing system of FIG. 2A according to one embodiment of the invention.

Turning now to FIG. 2B, a simplified block diagram of one embodiment of data processing system 200 emphasizing the system's software architecture is presented. In the depicted embodiment, system 200 includes a processor 102 discussed previously, as well as an operating system 224, an application programming interface (API) 226, and a Java virtual machine (JVM) 220. In addition, system 200 includes one or more application programs 222a, 222b, etc. (generically or collectively referred to herein as application program(s) 222). In one embodiment, each application program 222 represents a Java object or Java applet. JVM 220 is an abstract computing machine that includes an instruction set and uses various memory areas. JVM 220 provides a Java platform that is capable of hosting an application on any computer or operating system without rewriting or recompiling. JVM 220 is also responsible for the compactness of applications 222, which are preferably written in the Java programming language, and is the basis for its security capabilities. For additional information regarding Java and JVM 220, the reader is referred to T. Lindholm and F. Yellin, *The Java Virtual Machine Specification Second Addition* (Addison-Wesley 1999) ISBN: 0-201-43294-3, which is incorporated by reference herein.

Figure 3:
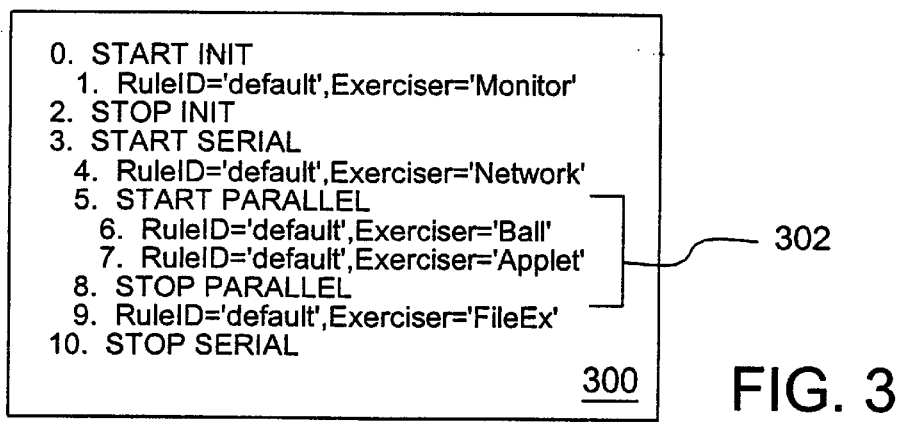
FIG. 3 depicts a test sequence including a parallel test segment to which the present invention may be implemented.

Turning now to FIG. 3, an exemplary test sequence 300 generated either manually or with the aid of a graphical user interface such as the interface disclosed in the '629 application is depicted. The '629 application discloses a method and software that facilitates the creation of complex test sequences, such as test sequence 300, that include one or more parallel segments. Lines 5 through 8 of test sequence 300 define one such parallel segment 302.

When a parallel test segment is defined, the individual test cases within the parallel test segment are executed simultaneously. The simultaneous execution of multiple test cases within a parallel test segment could be achieved by initiating each of the test cases simultaneously. While simultaneously initiating two or more test cases provides information about interactions between the test cases, the present invention contemplates generating a far greater amount of information about interactions between two or more test cases by repeatedly executing the parallel test segment while varying the times at which the test cases within the parallel test segment begin to execute with respect to one another. By varying the relative start points of test cases in a parallel test segment, the present invention extends the benefits disclosed in the '629 application by examining additional interactions between individual test cases. The invention thus provides an improved simulation of the interactions that can occur in the real world where objects and applications on a network may begin to execute at random intervals with respect to one another.

Returning now to the test sequence 300 depicted in FIG. 3, parallel test segment 302 includes first and second test cases. In the depicted embodiment, the first test case is a ball exerciser that exercises the display of a bouncing (or static) ball on a display screen and the second test case is an applet exerciser that simulates the execution of a Java applet. It will be appreciated that any suitable test case may be substituted for the ball exerciser and applet exerciser depicted in FIG. 3. In addition, the first and second test cases may comprise first and second instances of the same test case and parallel test segment 302 may include more than two test cases.

Figure 4:
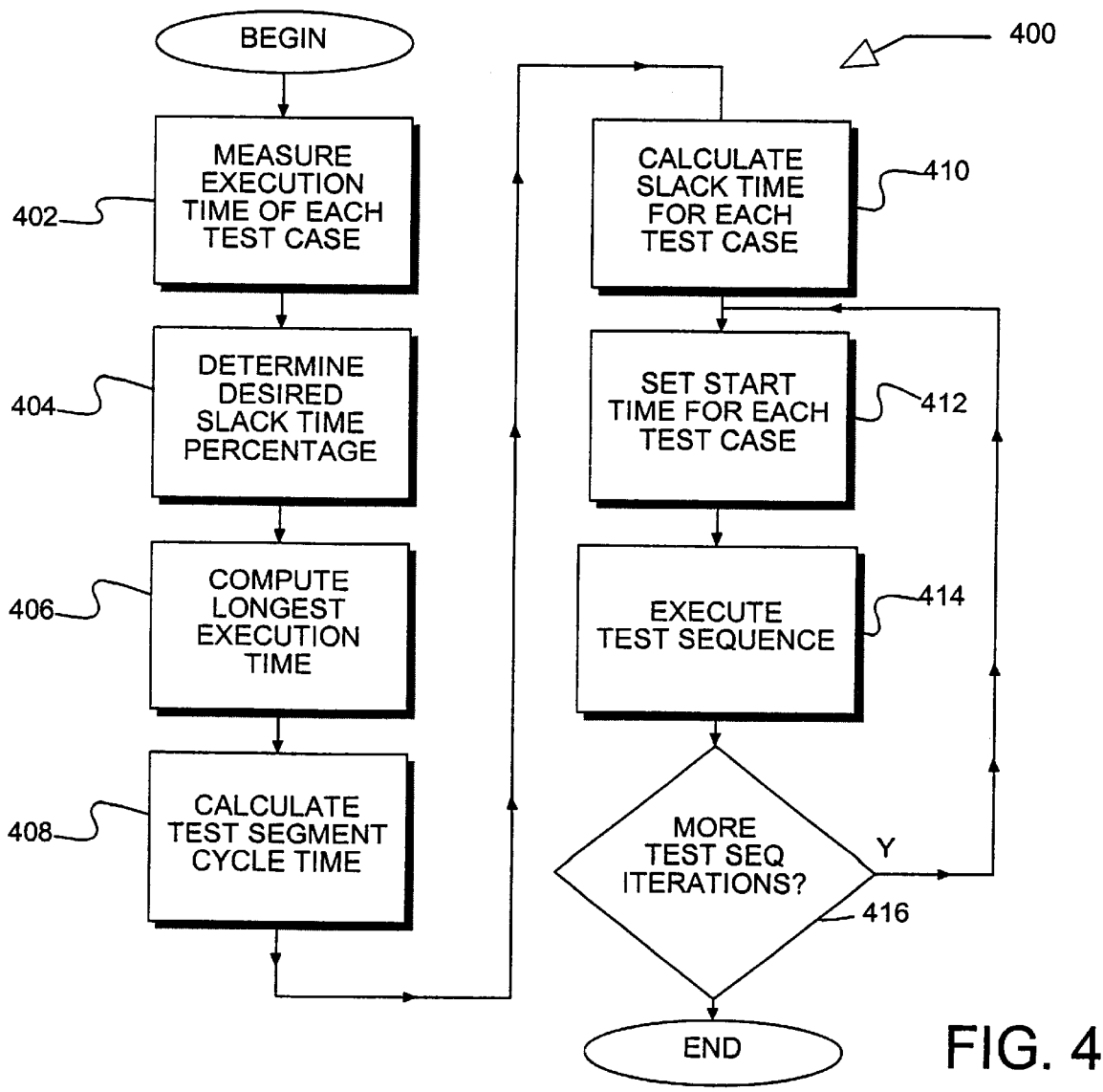
FIG. 4 depicts a flow diagram of a method for stressing interactions between test cases in a parallel test segment according to one embodiment of the invention.

Referring now to FIG. 4, one embodiment of the invention contemplates a method 400 of executing test cases in a parallel test segment such as parallel test segment 302 of a test sequence such as test sequence 300. Generally speaking, method 400 varies the relative start times of the parallel segment test cases each time the test sequence is executed. In this manner, any unintended interactions between an individual operation in the first test case and an individual operation in the second test are more likely to be discovered because the individual operations in each test segment are executed at varying times with respect to one another.

During the first execution of the test sequence, the execution time of each test case in the parallel segment is measured (block 402). The cycle time of the parallel test segment as a whole must be at least as long as the longest executing test case. The invention contemplates incorporating additional time (referred to herein as slack time) into cycle time of the parallel test segment to facilitate relative displacement of the test case start times with respect to one another.

In the depicted embodiment, a slack time for the test cycle is determined in block 404. The slack time may be input from the operator or may be determined automatically by the test system. Typically the slack time is expressed as a percentage. A 100% slack time implies that the parallel test segment cycle time will be twice as long as the longest test case. After the slack time is determined and the execution time of each test case is measured, the system computes (block 406) the longest test case execution time by determining the maximum of the measured test times. The parallel test segment time is then calculated (block 408) by converting the slack time percentage to real time using the longest executing test case.

After the parallel test segment cycle time is calculated, the slack time for each individual test case is calculated (block 410). If, for example, a parallel test segment includes a first test case with an execution time of 1.0 seconds and a second test case with an execution time of 0.7 seconds, the first test case has the longest execution time. If the operator indicates a desired slack time of 100%, the parallel test segment cycle time is then determined to be 2.0 seconds (1.0+100% of (1.0)). The slack time for the first test case is then computed to be 1.0 seconds (cycle time—execution time) and the slack time for the second test case is 1.3 seconds.

The slack times for each test indicate a window of time in which each of the test cases may be initiated and still complete within the test segment cycle time. Ideally, the test segment cycle time is significantly less than the total test time desired so that the parallel test segment can be executed many times using varying slack times for each test case in the test segment. In one embodiment, for example, it is desirable if the total test time is sufficient to permit at least 1000 executions of the parallel test segment. The greater the number of times that the test segment is executed, the more likely is the test system to discover any interactions between test cases in the test segment.

After the slack time is determined for each test case in a parallel test segment, start times for each test case in the test segment are set (block 412). The start times for each test case must be less than or equal to the slack time corresponding to the test case so that the test case can complete execution in the test segment cycle time. In one embodiment, the start times for each test case are set randomly by the test system within the window defined by their corresponding slack times so that, over multiple executions of the test segment, the start times of the test cases comprising the test segment will vary with respect to one another over a range of values. In this manner, the invention facilitates discovery of interactions between test cases that might otherwise go undiscovered during a conventional simulation in which the individual test cases are initiated simultaneously or in some other manner beyond the control of the user. After setting the start times for each test case in the test segment, the test sequence (including the test segment) is executed (block 414) by the system. Typically, the system monitors for and logs any unintended interactions between test cases that are detected during execution of the test case.

In an embodiment where the number of test sequence iterations is specified by the user, the system determines (block 416) whether the number of test sequence iterations that have been executed exceeds the specified value. The number of test sequence iterations may be input as an integer number or it may be derived by obtaining a user specified maximum total test time and dividing the total test time by the cycle time of the test sequence as a whole. If the maximum number of iterations has been reached, the testing is terminated. If additional iterations are required, start times for each test case in the parallel test segment are re-set, preferably using a technique that results in a random distribution of the start times of the various test cases with respect to one another, and the test sequence is re-executed.

Figure 5A:
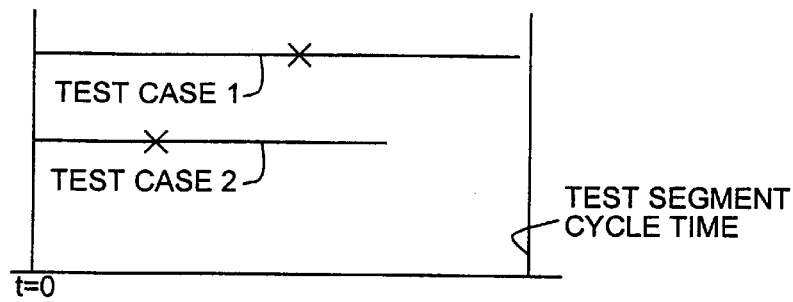
FIG. 5 illustrates operation of the method of FIG. 4.
Figure 5B:
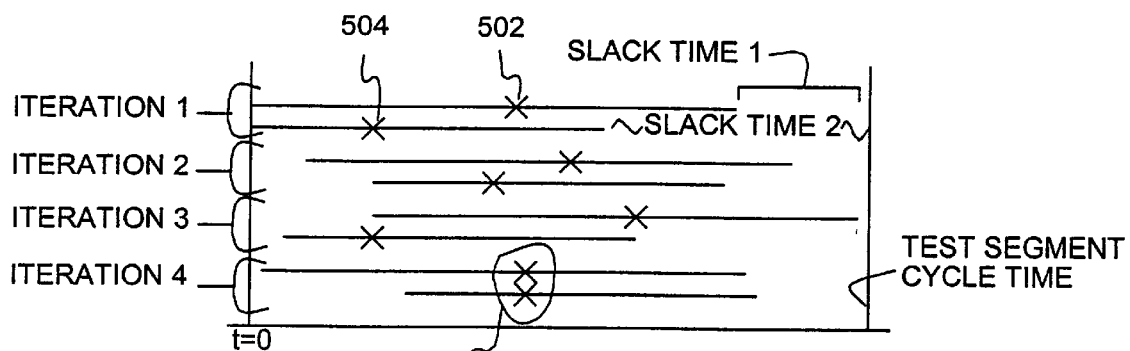

Turning now to FIGS. 5A and 5B, the execution of a parallel test segment with static starting times and with randomly varying start times are illustrated. In FIG. 5A, TEST CASE 1 and TEST CASE 2 are each simultaneously initiated every time the test segment is executed. The test segment cycle time is essentially equal to the cycle time of the longest executing test case. In contrast, the test segment cycle time as illustrated in FIG. 5B is increased to incorporate slack time that permits the test system to vary the initiation time of the test cases that comprise the test segment. In FIG. 5B, four iterations of the test segment are illustrated, where the start time for both test cases in the test segment is varied from iteration to iteration. The slack time for each test case is illustrated with respect to ITERATION 1, where the start times of both test cases is t=0.

Also indicated in FIG. 5B by reference numerals 502 and 504 are events or operations that, if executed simultaneously could result in an unintended interaction between the test cases. If these events are positioned chronologically within their respective test cases such that they do not occur simultaneously if both test cases are initiated simultaneously, the execution of the test segment with zero slack time and static start times for each test case will not reveal the interdependency between the two test cases. As depicted in FIG. 5B, however, executing the test segment a sufficient number of times while varying the test case start times for each execution may result in the discovery of the interdependency when events 502 and 504 are executed substantially simultaneously as indicated at reference numeral 506. Moreover, the random positioning of test cases with respect to one another within the test segment, as depicted in FIG. 5B, presents a more realistic simulation of the manner in which events are likely to occur on an actual network or system.

It will be apparent to those skilled in the art having the benefit of this disclosure that the present invention contemplates a method and system for generating complex test sequences interactively using a graphical user interface. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing test cases in a test system, comprising:

defining a test sequence including a parallel test segment comprising at least a first test case and a second test case;

determining a cycle time of the parallel test segment, wherein the determined cycle time is longer than the execution time of the first and second test cases to permit variation of the relative starting times of the first and second test cases within the parallel test segment; and executing the test sequence, including the parallel test segment, repeatedly, wherein executing the parallel test segment comprises executing the first and second test cases simultaneously, and wherein initiation of the first and second test cases with respect to one another is varied during each iteration of the test sequence.

2. The method of claim 1, wherein determining the parallel segment cycle time includes measuring the execution time of the first and second test cases the first time the test sequence is executed and comparing the execution times to determine the maximum execution time.

3. The method of claim 1, wherein determining the parallel segment cycle time includes obtaining a slack time percentage indicative of the ratio of the parallel test segment cycle time and the execution time of the longest test case in the parallel test segment.

4. The method of claim 1, wherein determining the cycle time comprises:

measuring the execution time of the first test and second test case;

determining a desired slack time for the first test case where the execution time of the first test case is greater than the execution time of the second test case;

calculating a test segment cycle time based on the measured cycle times and the desired slack time; and calculating a slack time for second test case based on the test segment cycle time and the measured execution time of the second test case.

5. The method of claim 1, wherein varying the initiation of first and second test cases with respect to one another includes randomly generating a first start time for the first test case and a second start time for the second test case.

6. The method of claim 1, wherein executing the test sequence repeatedly comprises executing the test sequence a user specified number of iterations.

7. The method of claim 1, wherein executing the test sequence repeatedly comprises executing the test sequence repeatedly for a user specified total test time.

8. A computer program product comprising a set of processor executable instructions contained on a computer readable medium for testing test cases with a parallel test segment of a test sequence, the set of instructions comprising:

computer code means for defining a test sequence including a parallel test segment comprising at least a first test case and a second test case;

computer code means for determining a cycle time of the parallel test segment, wherein the determined cycle time is longer than the execution time of the first and second test cases to permit variation of the relative starting times of the first and second test cases within the parallel test segment; and computer code means for executing the test sequence repeatedly, wherein initiation of the first and second test cases with respect to one another is varied during each test sequence.

9. The computer program product of claim 8, wherein determining the parallel segment cycle time includes measuring the execution time of the first and second test cases the first time the test sequence is executed and comparing the execution times to determine the maximum execution time.

10. The computer program product of claim 8, wherein determining the parallel segment cycle time includes obtaining a slack time percentage indicative of the ratio of the parallel test segment cycle time and the execution time of the longest test case in the parallel test segment.

11. The computer program product of claim 8, wherein determining the cycle time comprises:

measuring the execution time of the first test and second test case;

determining a desired slack time for the first test case where the execution time of the first test case is greater than the execution time of the second test case;

calculating a test segment cycle time based on the measured cycle times and the desired slack time; and calculating a slack time for second test case based on the test segment cycle time and the measured execution time of the second test case.

12. The computer program product of claim 8, wherein varying the initiation of first and second test cases with respect to one another includes computer code means for randomly generating a first start time for the first test case and a second start time for the second test case.

13. The computer program product of claim 8, wherein the computer code means for executing the test sequence repeatedly comprises computer code means for executing the test sequence a user specified number of iterations.

14. The computer program product of claim 8, wherein the computer code means for executing the test sequence repeatedly comprises computer code means for executing the test sequence repeatedly for a user specified total test time.

15. A data processing system including processor, memory, and display, wherein the memory contains at least a portion of a sequence of computer executable instructions suitable for executing test cases in a parallel test segment of a test sequence, wherein computer executable instructions include:

computer code means for defining a test sequence including a parallel test segment comprising at least a first test case and a second test case;

computer code means for determining a cycle time of the parallel test segment, wherein the determined cycle time is longer than the execution time of the first and second test cases to permit variation of the relative starting times of the first and second test cases within the parallel test segment; and computer code means for executing the test sequence repeatedly, wherein each iteration of the test sequence includes executing the parallel test sequence during which the first and second test cases execute simultaneously, and further wherein initiation of the first and second test cases with respect to one another is varied during each iteration of the test sequence.

16. The data processing system of claim 15, wherein determining the parallel segment cycle time includes measuring the execution time of the first and second test cases the first time the test sequence is executed and comparing the execution times to determine the maximum execution time.

17. The data processing system of claim 15, wherein determining the parallel segment cycle time includes obtaining a slack time percentage indicative of the ratio of the parallel test segment cycle time and the execution time of the longest test case in the parallel test segment.

18. The data processing system of claim 15, wherein determining the cycle time comprises:

measuring the execution time of the first test and second test case;

determining a desired slack time for the first test case where the execution time of the first test case is greater than the execution time of the second test case;

calculating a test segment cycle time based on the measured cycle times and the desired slack time; and calculating a slack time for second test case based on die test segment cycle time and the measured execution time of the second test case.

19. The data processing system of claim 15, wherein varying the initiation of first and second test cases with respect to one another includes computer code means for randomly generating a first start time for the first test case and a second start time for the second test case.

20. The data processing system of claim 15, wherein the computer code means for executing the test sequence repeatedly comprises computer code means for executing the test sequence a user specified number of iterations.

21. The data processing system of claim 15, wherein the computer code means for executing the test sequence repeatedly comprises computer code means for executing the test sequence repeatedly for a user specified total test time.

* * * * *